United States Patent [19]

Tremaine

[11] Patent Number: 5,668,680

[45] Date of Patent: Sep. 16, 1997

[54] TIME OPTIMAL CONTROL OF A DISC DRIVE ACTUATOR WITH VIBRO-ACOUSTIC CONSTRAINTS

[75] Inventor: Brian P. Tremaine, San Jose, Calif.

[73] Assignee: Seagate Technology, Inc., Scotts Valley, Calif.

[21] Appl. No.: 608,019

[22] Filed: Mar. 4, 1996

Related U.S. Application Data

[60] Provisional application No. 60/004,102 Sep. 21, 1995.

[51] Int. Cl.$^6$ .................................................. G11B 5/596
[52] U.S. Cl. ..................................... 360/78.07; 360/78.09
[58] Field of Search .............................. 360/78.07, 78.09, 360/78.06, 78.04, 75

[56] References Cited

U.S. PATENT DOCUMENTS

| | | | |
|---|---|---|---|
| 5,262,907 | 11/1993 | Duffy et al. | |
| 5,282,100 | 1/1994 | Tacklind et al. | 360/97.02 |
| 5,465,034 | 11/1995 | Andrews, Jr. et al. | 360/78.06 X |
| 5,475,545 | 12/1995 | Hampshire et al. | |
| 5,566,095 | 10/1996 | Cameron et al. | 360/78.09 X |

OTHER PUBLICATIONS

Text by Franklin, Powell & Workman, "Digital Control of Dynamic Systems", Addison–Wesley Publishing Co., Second Edition, 1990, pp. 250–280, pp. 257–260; pp. 265–267; pp. 272–280.

Article by Katoh, "Vibrationless Seeking Control Using Slew–Rate Limit for Disk Drives", 2nd International Conference on Motion and Vibration Control, Yokohama, Japan Sep. 1994, pp. 728–732.

Text by Bryson & Ho, "Applied Optimal Control", Hemisphere Publishing, 9th Edition, 1975, pp. 45–136; of particular interest –pp. 131–135.

Technical Report No. 90–16 by Min & Bhat, "Residual–Vibrationless Track Accessing Control for Computer Rigid Disk Drives Using Laplace Transform Technique", UCLA School of Mechanical Engineering Oct., 1990; pp. 5–9.

Primary Examiner—Aristotelis M. Psitos
Assistant Examiner—James L. Habermehl
Attorney, Agent, or Firm—Bill D. McCarthy; Edward P. Heller, III; Randall K. McCarthy

[57] ABSTRACT

A method for optimizing the demand velocities in a disc drive velocity profile using both time and vibro-acoustic constraints. An accurate, high-order dynamic model of the disc drive is formulated which describes the vibro-acoustic output of the drive in response to actuator coil current input, taking into account the disc drive actuator structure and the electrical response of the disc drive servo circuit. From this dynamic model, the shortest possible seek time is determined for a selected seek length which can achieve a vibro-acoustic output below a selected, maximum limit, as well as settling within a specified tolerance of the target track. Once the shortest possible seek time is determined, the demand velocity values in the velocity profile are selected so as to minimize the maximum position error during the seek settle. The demand velocity values are subsequently provided in a look up table for use during a seek by the disc drive servo circuit.

8 Claims, 6 Drawing Sheets

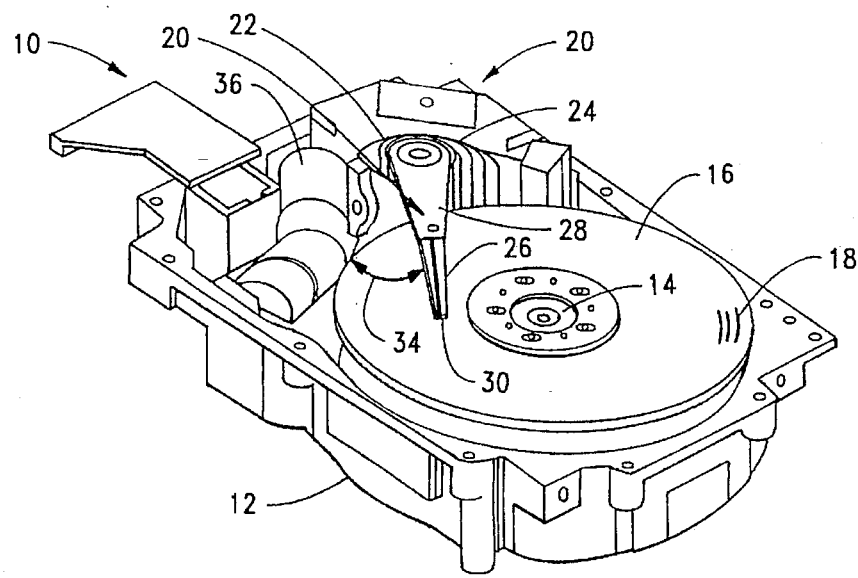
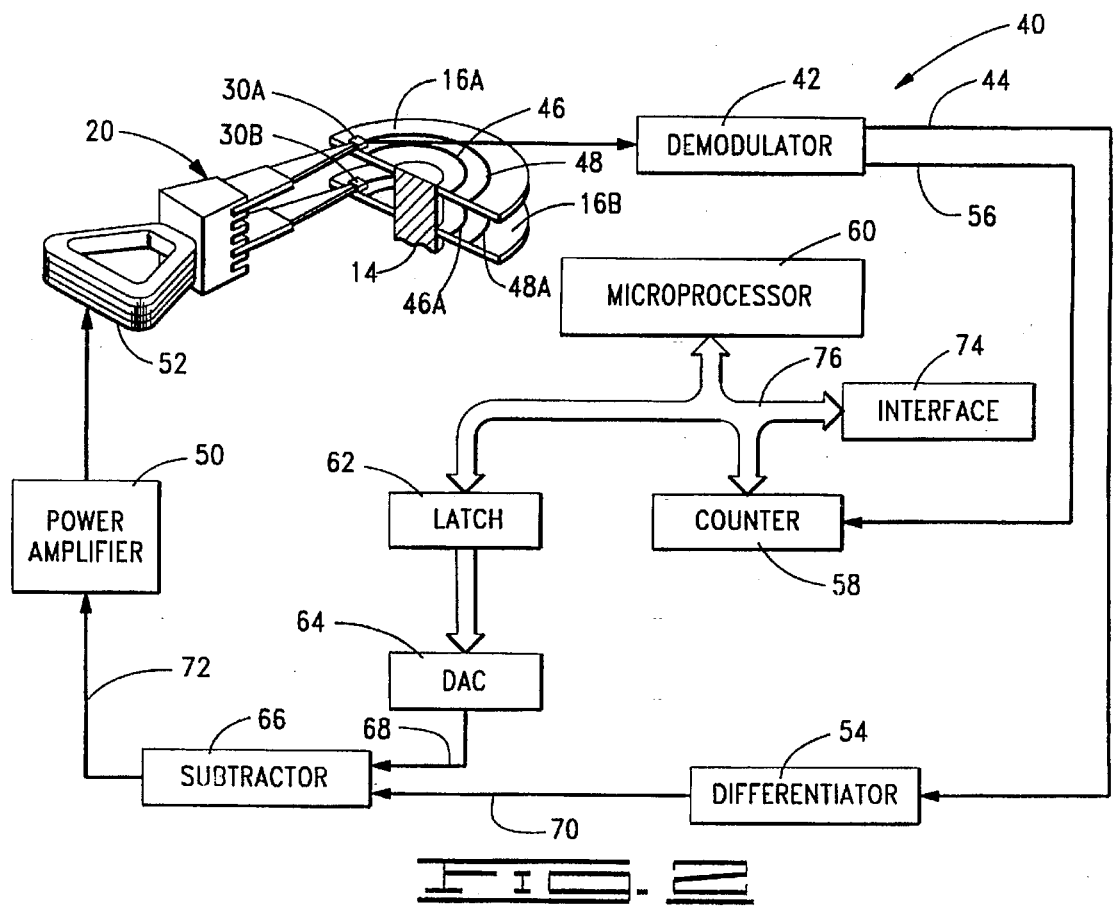

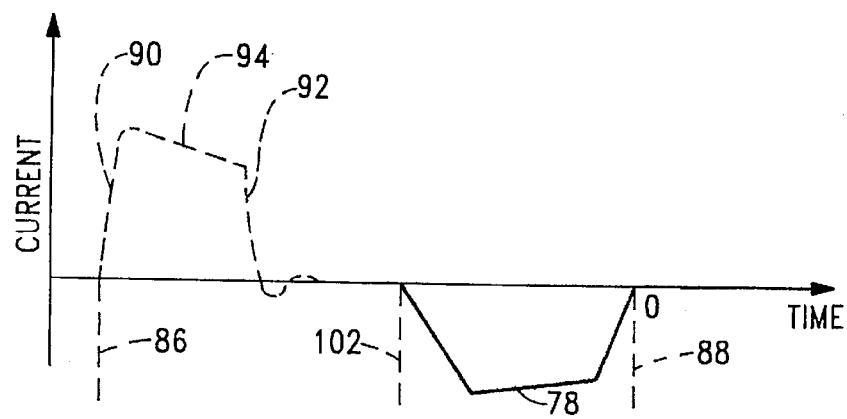
PRIOR ART
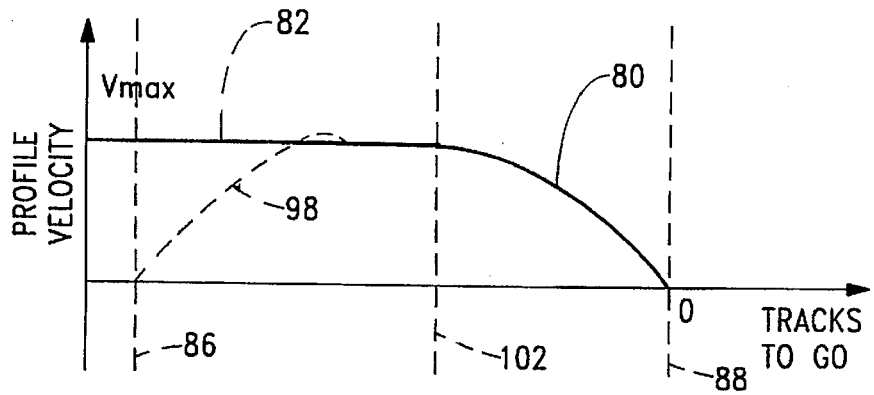
PRIOR ART
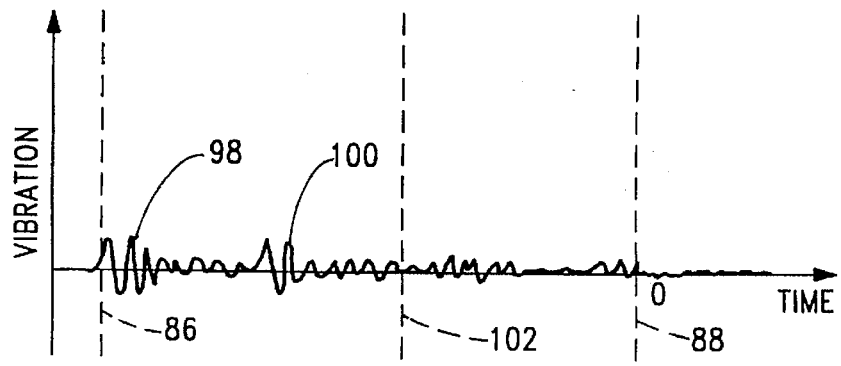
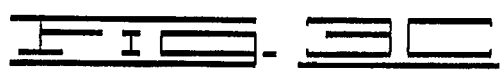
PRIOR ART

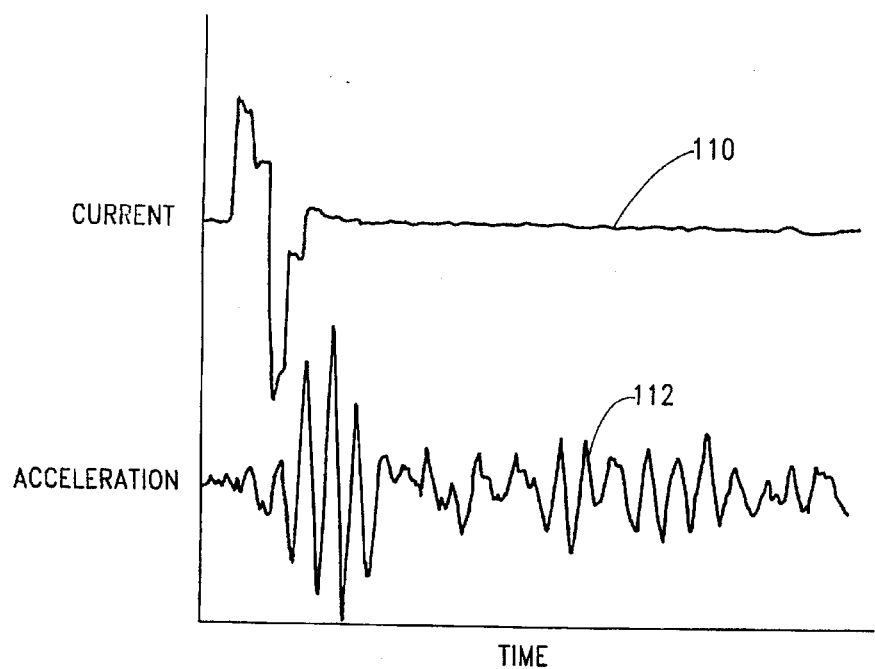
FIG. 4
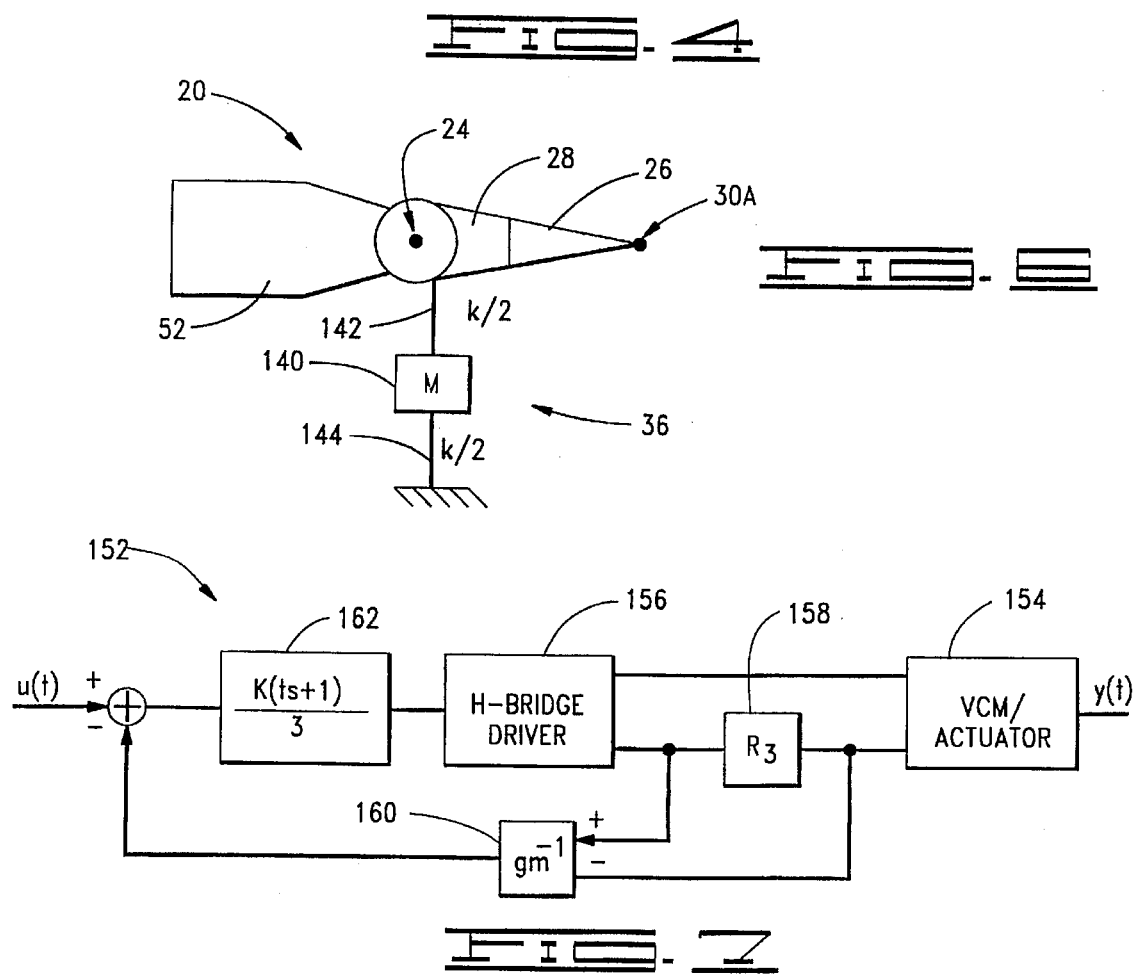
FIG. 5
FIG. 7

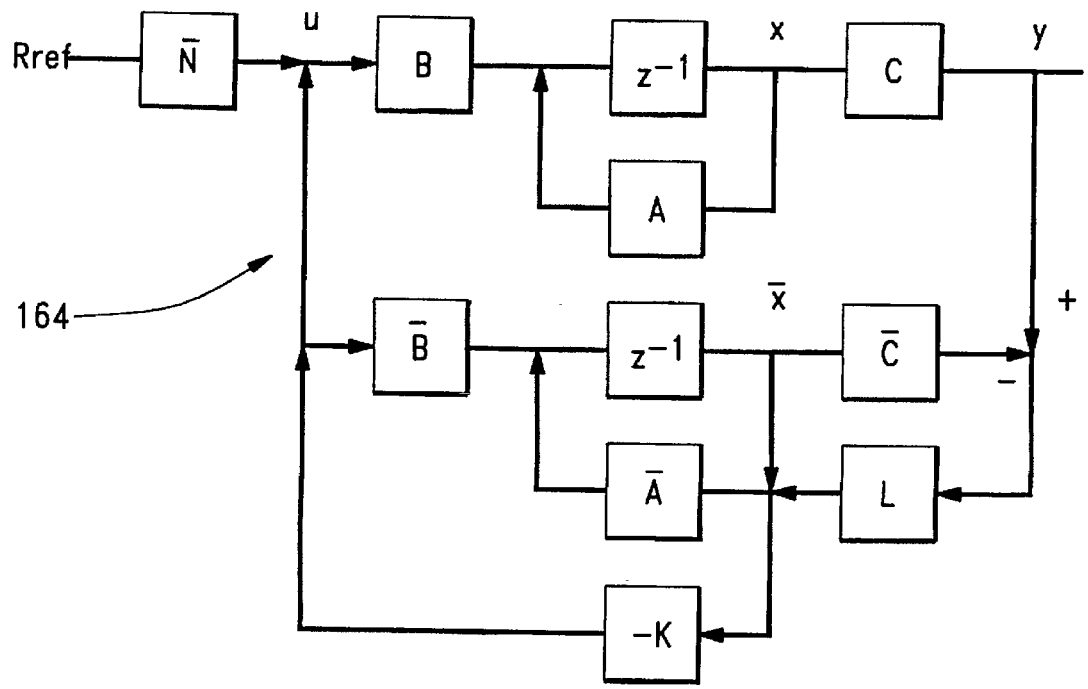
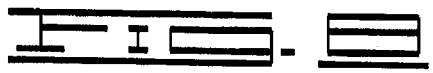
| ACCELERATION CONSTRAINT $\gamma v (M/S^2)$ | SAMPLES, N | | | | | |
|---|---|---|---|---|---|---|
| | 1 | 2 | 3 | 4 | 5 | 6 |
| 1.0 | 336 | -167 | 4 | | | |
| 0.7 | 245 | -38 | -52 | | | |
| 0.5 | 122 | 51 | -38 | -12 | | |
| 0.4 | 40 | 64 | 30 | -31 | | |
| 0.3 | 21 | 19 | 40 | 1 | -16 | |
| 0.2 | -1 | 5 | 22 | 23 | 13 | |
| 0.1 | -33 | -21 | -8 | 12 | 30 | 21 |
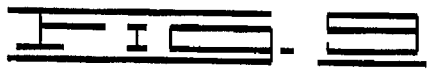

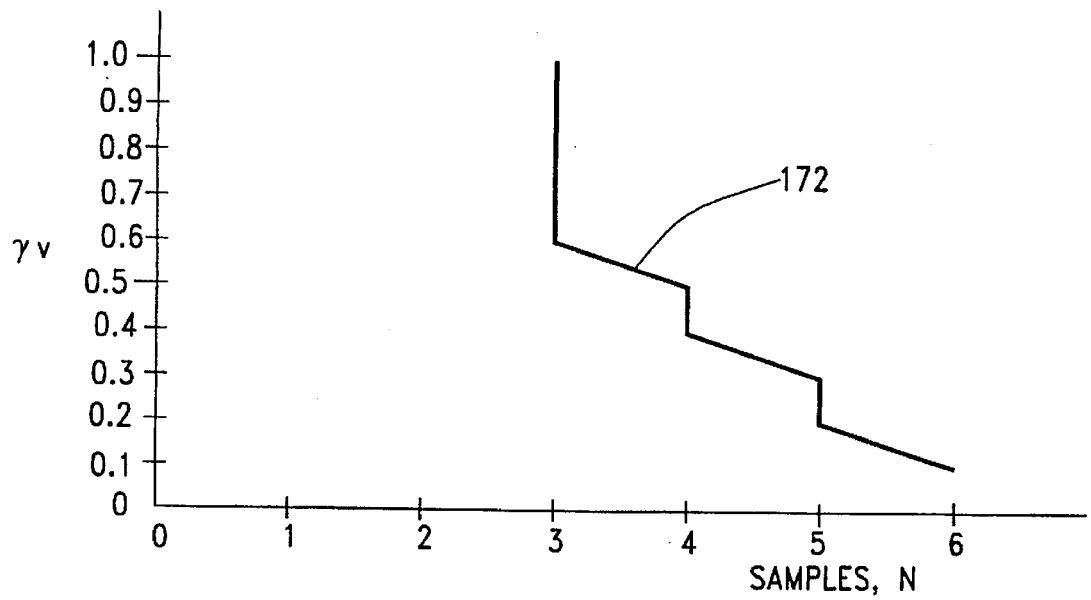
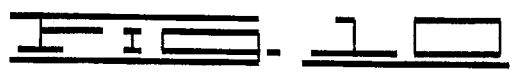
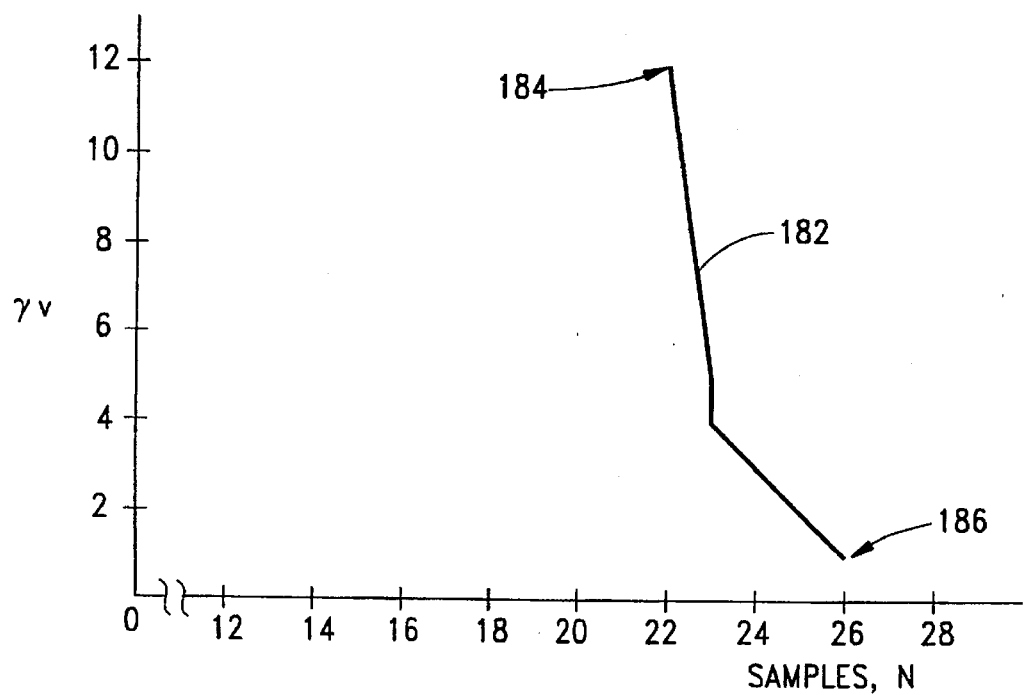
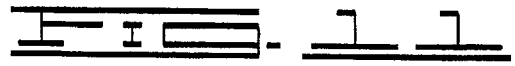

TIME OPTIMAL CONTROL OF A DISC DRIVE ACTUATOR WITH VIBRO-ACOUSTIC CONSTRAINTS

RELATED APPLICATION

This application claims the benefit of U.S. Provisional Patent Application No. 60/004,102 filed Sep. 21, 1995.

BACKGROUND OF THE INVENTION

1. Field of the Invention

The present invention relates generally to the field of disc drive data storage devices, and more particularly, but not by way of limitation, to a method for optimizing the operation of a disc drive actuator during a seek.

2. Discussion

Modern hard disc drives comprise one or more rigid discs that are coated with a magnetizable medium and mounted on the hub of a spindle motor for rotation at a constant high speed. Information is stored on the discs in a plurality of concentric circular tracks by an array of transducers ("heads") mounted to a radial actuator for movement of the heads relative to the discs.

Typically, such radial actuators employ a voice coil motor to position the heads with respect to the disc surfaces. The heads are mounted via flexures at the ends of a plurality of arms which project radially outward from a substantially cylindrical actuator body. The actuator body pivots about a shaft mounted to the disc drive housing at a position closely adjacent the outer extreme of the discs. The pivot shaft is parallel with the axis of rotation of the spindle motor and the discs, so that the heads move in a plane parallel with the surfaces of the discs.

The actuator voice coil motor includes a coil mounted on the side of the actuator body opposite the head arms so as to be immersed in the magnetic field of an array of permanent magnets. When controlled current is passed through the coil, an electromagnetic field is set up which interacts with the magnetic field of the magnets and causes the coil to move relative to the magnets in accordance with the well-known Lorentz relationship. As the coil moves, the actuator body pivots about the pivot shaft and the heads are moved across the disc surfaces.

Typically, the heads are supported over the discs by actuator slider assemblies which include air-bearing surfaces designed to interact with a thin layer of moving air generated by the rotation of the discs, so that the heads are said to "fly" over the disc surfaces. Generally, the heads write data to a selected data track on the disc surface by selectively magnetizing portions of the data track through the application of a time-varying write current to the head. In order to subsequently read back the data stored on the data track, the head detects flux transitions in the magnetic fields of the data track and converts these to a signal which is decoded by read channel circuitry of the disc drive.

A closed-loop servo system is used to control the position of the heads with respect to the disc surfaces. More particularly, during a track following mode in which a head is caused to follow a selected data track, servo information is read which provides a position error signal indicative of the relative position error of the head to the track. The position error signal is used to generate a correction signal which is provided to a power amplifier, which passes current through the actuator coil to adjust the position of the head relative to the track.

The data tracks are divided into sectors so that a head can be moved to a selected sector on a selected data track by instructing the servo system to carry out a seek to that track. During a seek operation, the servo system receives the address of the destination track and generates control signals that cause the heads to initially accelerate and then subsequently decelerate as the head nears the destination track. It will be recognized that at some point towards the end of the deceleration of the head, the servo system will transition to a settle mode during which the head is settled onto the destination track and, thereafter, the servo system causes the head to follow the destination track in a fine control mode.

Typically, a velocity profile is used during a seek to control the movement of the head towards the destination track. The velocity profile determines the velocity the head should have at various distances from the destination track and, at each of a succession of tracks terminating with the destination track, the servo system provides a control signal to the power amplifier having a magnitude that is directly proportional to the difference between the profile velocity and the actual velocity of the head. The profile velocity is generally shaped with respect to the number of tracks covered in a seek and includes an initial acceleration portion, during which the heads accelerate from an initial radial velocity to some maximum velocity and a deceleration portion, during which the heads decelerate from the maximum velocity to a velocity of near zero at the destination track. In relatively long seeks, the heads will "coast" for a time at the maximum velocity after being fully accelerated towards the destination track, and this maximum velocity may be determined based on a variety of criteria, including for example, the maximum current that the power amplifier can reliably supply to the actuator coil.

It will be recognized that in the past, velocity profile have been designed so as to generally minimize the time required to move the head from an initial track to a selected destination track. Because the control signal provided to the power amplifier is proportional to the difference between the profile velocity and the actual velocity of the head, the head can be caused to rapidly accelerate towards the destination track during a seek by providing a velocity profile containing relatively large velocities at the beginning of the seek.

Generally, however, as the acceleration called for by the velocity profile is increased, a correspondingly greater amount of acoustic noise is generated by unmodeled mechanical resonances induced in the disc drive structure during the seek. Such noise has been found to be increasingly undesirable by disc drive users, and so efforts have been made to minimize the generation of acoustic noise during a seek, while at the same time minimizing the time required to perform the seek. A complicating factor in reducing the acoustic noise generated during a seek, however, results from the continuing trend in the disc drive industry to develop products with ever increasing areal densities (greater than 1 $Gbit/in^2$) and decreasing access times (less than 10 ms). As this trend continues, greater constraints are being placed on the positional accuracy of servo systems and the effects of mechanical resonances on disc drive structures.

It will be recognized that the operation of the VCM in positioning the actuator with respect to the disc has been typically modeled as a single input, single output (SISO) system, with the input being the current provided to the actuator coil and the output being head position. The system is controlled with feedback derived from a Kalman filter state estimator. Such systems are typically 3rd order and may be controlled by way of the well-known Hamilton-Jacobi-Bellman (HJB) equations; see, for example the text by Bryson and Ho, "APPLIED OPTIMAL CONTROL", Hemisphere Publishing, 9th Edition, 1975, pp. 48–135.

Generally, the objective of a typical seek has been to move the head from the initial track to the destination track in a minimum amount of time (access time), with the only constraint being the amount of current available to drive the coil. Thus, a drawback to actuator control based upon the HJB approach is that the mechanical resonances excited during the seek are not modeled, yet these resonances can lengthen the time required to settle at the destination track as well generate undesirable acoustic noise.

Thus, one approach to minimizing the generation of acoustic noise during seeks has involved efforts to shape the velocity profile in such a manner as to reduce sharp transitions in the values of the profile, for example, see U.S. Pat. No. 5,475,545 entitled METHOD FOR REDUCING NOISE DURING SEEKS IN A HARD DISK DRIVE, issued Dec. 12, 1995 to Hampshire and McKenzie, assigned to the assignee of the present invention and incorporated herein by reference. Additionally, efforts have been made to shield the sound power generated during such seeks through the addition of acoustic damping material to disc drive assembly structures and housings.

More sophisticated attempts to reduce the generation of acoustic noise during seeks have involved designing a velocity profile input which as no residual Fourier components at poles of the dynamic structure; see, for example Katoh, "VIBRATIONLESS SEEKING CONTROL USING SLEW-RATE LIMIT FOR DISK DRIVES", 2nd International Conference on Motion and Vibration Control, Yokohama, Japan, September 1994. The drawback to this approach, however, is that a highly complex system (such as a disc drive structure) will have many poles and each pole will have a corresponding tolerance. Thus, the resulting control design will not be robust in terms of accounting for the real world tolerances present in high-volume disc drive manufacturing processes.

There is a need, therefore, for an improved approach to obtaining a velocity profile for a disc drive seek that optimizes seek-time constraints while at the same time minimizes the vibro-acoustic response of the dynamic structure of the disc drive.

SUMMARY OF THE INVENTION

The present invention provides a method whereby the demand velocities for a disc drive velocity profile are optimized using both time and vibro-acoustic constraints. Generally, in the practice of the method of the present invention, an accurate, high-order dynamic model of the disc drive is formulated, describing the vibro-acoustic output of the drive in response to actuator coil current input, taking into account the disc drive actuator structure and the electrical response of the servo circuit. From this dynamic model, the shortest possible seek time is determined for a selected seek length which can achieve a vibro-acoustic output below a selected, maximum limit, as well as settling within a specified tolerance of the target track. Once the shortest possible seek time is determined which can meet this limit, the demand velocity values in the velocity profile are selected so as to minimize the maximum position error during the seek settle. The demand velocity values are subsequently provided in a look up table for use during a seek by the disc drive servo circuit.

Further, the method of the present invention treats the optimization of seek time using the aforementioned vibro-acoustic constraints as a linear program (LP), in order to solve for both the minimum seek time and minimum settle error response. Analyzing the problem as an LP provides that problem size does not depend upon the order of the system. Additionally, the problem input can be obtained from measured impulse response data. Moreover, data from a population of systems can be used to find a robust solution.

An object of the present invention is to determine an optimum velocity profile for a disc drive seek that achieves the minimum seek time while providing a disc drive acoustic response below a predetermined, acceptance limit.

Another object of the present invention is to design the velocity profile using an analytical approach that does not entail modifications to the disc drive structure in order to accomplish the required reduction in disc drive acoustic noise generation.

Still another object of the present invention is to find a robust solution that can be applied uniformly to a population of disc drives, such as in a large-scale disc drive manufacturing process, taking into account the myriad of mechanical tolerances present in such a population.

Other objects, advantages and features of the present invention will be apparent from the following description when read in conjunction with the drawings and appended claims.

BRIEF DESCRIPTION OF THE DRAWINGS

FIG. 1 is a perspective view of a disc drive in which the method of the present invention can be practiced.

FIG. 2 provides a functional block diagram of the servo circuit of the disc drive of FIG. 1.

FIG. 3a is a graphical representation of a current profile used during a disc drive seek of the prior art. FIG. 3b is a graphical representation of a velocity profile used during a disc drive seek of the prior art. FIG. 3c is a graphical representation of the acceleration of the top cover of a disc drive, the acceleration induced by the prior art seek described with reference to FIGS. 3a and 3b.

FIG. 4 is a graphical representation of an output acceleration curve in response to an input current curve provided to the actuator assembly of FIGS. 1 and 2.

FIG. 6 is a generalized rigid body diagram of the actuator assembly of FIGS. 1 and 2.

FIG. 7 is a block diagram representation of a plant comprising the VCM, actuator assembly and power amplifier of the disc drive of FIGS. 1 and 2.

FIG. 8 is a state diagram representation of the servo control circuit 40 of the disc drive, including the plant of FIG. 7 as well as estimator control circuitry, which generally corresponds to the servo control circuitry of FIG. 2.

FIG. 9 is a table showing optimum values for a velocity profile for a one track seek of the disc drive for various acceleration constraints.

FIG. 10 is a generalized pareto chart graphically illustrating the design tradeoffs available to a designer in selecting the desired performance of the disc drive for a one track seek.

FIG. 11 is a generalized pareto chart graphically illustrating the design tradeoffs available for a short seek of 40 tracks.

DESCRIPTION OF THE PREFERRED EMBODIMENT

Figure 5:
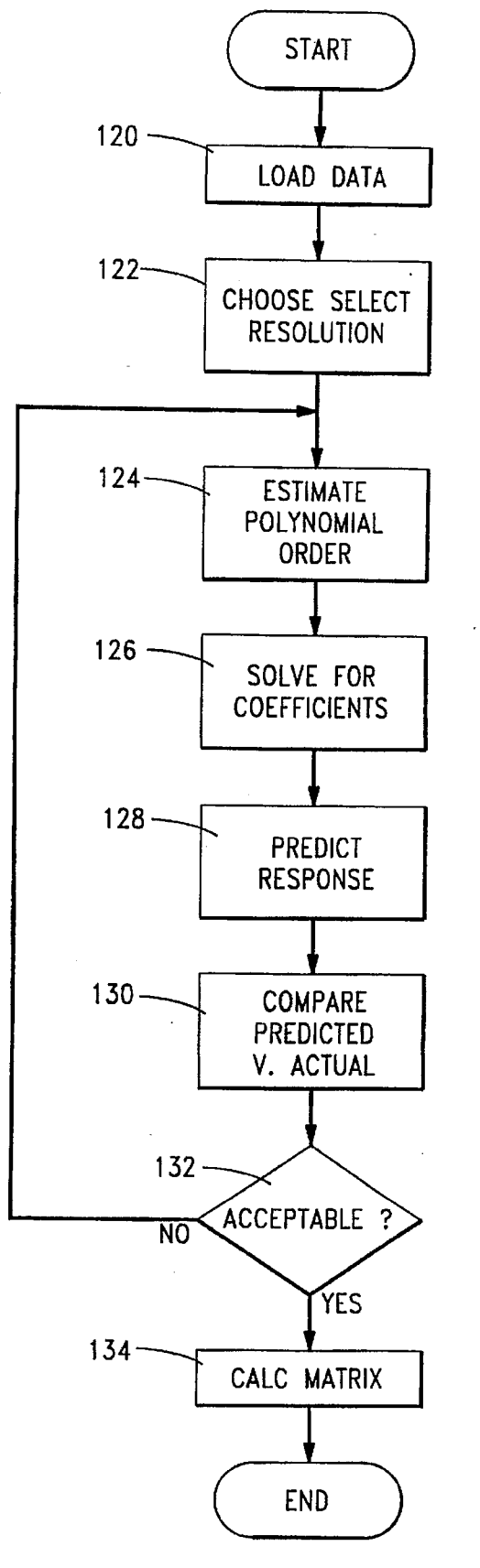
FIG. 5 is a generalized flow diagram illustrating the steps performed during a system identification operation of the present invention.

Turning now to the drawings and more particularly to FIG. 1, shown therein is a perspective view of a disc drive 10 with which the method of the present invention can be practiced. The disc drive 10 includes a housing base 12 and a top cover (not shown) which cooperatively engage to form a sealed housing which serves to protect delicate internal components from external contaminants.

A plurality of discs 16 are mounted for rotation on a spindle motor hub 14 using a disc clamp (not designated). An array of heads (one shown at 30) is mounted to an actuator assembly 20 by way of flexures 26, which are attached to head arms 28 of an actuator body 22. The actuator assembly 20 is adapted for pivotal motion about a pivot shaft 24 under control of a voice coil motor (VCM), shown generally at 32.

The VCM 32 is driven by a servo control circuit (not shown in FIG. 1) to controllably move the heads 30 to any desired one of a plurality of concentric circular tracks (not shown) on the discs 16 along arcuate path 34. Signals used to control the VCM 32, as well as signals to and from the heads 30, are passed via a flex circuit 36.

Referring now to FIG. 2, shown therein is a generalized functional diagram of a servo control circuit 40 of the disc drive 10, which operates to position the disc drive actuator assembly 20 with respect to the discs (two of which are identified in FIG. 2 as 16A and 16B). More particularly, the servo control circuit 40 of FIG. 2 operates to both maintain the radial alignment of the heads (two of which are identified as 30A and 30B) with respect to the discs 16A, 16B during a track following mode of operation and to move the heads 30A, 30B from an initial track to a destination track in a seek mode of operation.

It will be recognized that a variety of disc drive servo control systems have been implemented in order to perform track following and seeking, including the use of a dedicated servo surface to which a continuous servo pattern is written. In such a dedicated servo system, as the servo surface rotates, the servo pattern is read by a servo head in order to determine the location of the remaining heads with respect to the tracks on the discs, and the position of the actuator is adjusted accordingly. For more discussion concerning a typical dedicated servo system, see U.S. Pat. No. 5,262,907 entitled "HARD DISC DRIVE WITH IMPROVED SERVO SYSTEM", issued Nov. 16, 1993 to Duffy, McKenzie, Heydari and Woods, assigned to the assignee of the present invention and incorporated herein by reference.

An alternative to using a dedicated servo surface involves provided embedded servo information on all of the disc surfaces, so that the tracks are used to store both data and servo information. It will be recognized that a disc drive employing the use of an embedded servo system typically has less total servo information than a disc drive using a dedicated servo surface; that is, while a dedicated servo circuit receives substantially continuous head servo information, an embedded servo circuit receives servo information only on a periodic basis, resulting in periods of time in which servo information is not available to the servo circuit. Thus, disc drives with embedded servos typically include state estimation circuitry to provide estimates of head position, velocity and acceleration during periods of time in which actual servo information is not being read.

It will be recognized that seeks are generally performed in the same manner with both types of servo systems, with the exception that a velocity profile for a dedicated servo system will generally contain more values than a velocity profile for an embedded servo system. That is, corrections to the actual velocity of a head during a seek will be provided relatively more frequently by a dedicated servo system than by an embedded servo system. Thus, it will be recognized that the present invention is not dependent upon the particular type of servo scheme utilized to determine the location of the heads with respect to the discs and so, for purposes of clarity, a dedicated servo system will be presented herein.

Continuing with the circuit of FIG. 2, the head 30A (also referred to as a "servo head") is connected to a conventional demodulator circuit 42 which receives signals induced in the head 30A from servo information on the disc 16A (also referred to as a "servo disc"), and in response thereto, generates raw servo signals that are used by the servo control circuit 40 to perform track following or seek operations. More particularly, the demodulator circuit 42 sense the relative magnitude of successive servo pulses from the head 30A and provides a servo position error (SPE) signal on signal path 44, the SPE signal indicative of the relative distance between the head 30A and the closest servo track on the disc 16A (two such servo tracks are identified as 46 and 48). During track following, the SPE signal is provided to a conventional free control circuit (not shown) which generates a control signal that is, in turn provided to the input of a power, transconductance amplifier 50 (hereinafter "power amp"). In response to the magnitude of the control signal, the power amp 50 adjusts the current through an actuator coil 52, which is immersed in the magnetic field of the permanent magnets (not shown) of the VCM 32 (of FIG. 1) so that a force is provided upon the actuator assembly 20, positioning the head 30A with respect to the disc 16A accordingly. Thus, during track following, the servo control circuit 40 provides control signals indicative of the location of the servo head 30A with respect to the servo track being followed and the servo control circuit 40 continually moves the actuator assembly 20 to maintain the servo head 30A in radial alignment with the servo track. The data tracks on remaining disc surfaces (two shown at 46A and 48A) are arranged in cylinders so that each cylinder includes a servo track and one or more data tracks, all of which are nominally vertically aligned, so that servo track following by the servo head 30A results in data track following by the remaining data heads (one shown at 30B).

In order to perform a seek operation, the SPE signals are differentiated to obtain the radial velocity of the servo head 30A with respect to the surface of the disc 16A. More particularly, FIG. 2 provides a differentiator circuit 54 which receives and differentiates the SPE signal provided on signal path 44 by the demodulator circuit 42. Additionally, the demodulator circuit 42 provides track crossing signals on signal path 56, indicative of movement of the servo head 30A from the fine control region about one track to the free control region about an adjacent track. The track crossing signals on signal path 56 are shown to be provided to a counter 58, the purpose of which will be discussed below.

The present invention contemplates that seeks between tracks will be accomplished by comparing the actual velocity of the servo head 30A to a demand velocity of a predetermined velocity profile. To this end, the servo control circuit 40 of FIG. 2 is shown to include a microprocessor 60 which generates and outputs the demand velocity (also referred to as "profile velocity") on bus 76 to a latch 62 and, by way of a digital to analog converter (DAC) 64, to the positive input of a subtractor circuit 66 by way of signal path 68. Additionally, the output of the differentiator circuit 54 is shown provided to the negative input of the subtractor circuit 66 by way of signal path 70. Thus, the subtractor circuit 66 determines the difference between the signals provided on signal paths 68 (demand velocity) and 70 (actual velocity) and provides an output signal accordingly by way of signal path 72 to the power amp 50. In this manner, the servo head 30A is accelerated and decelerated during seeks in proportion to the difference between the actual velocity of the servo head 30A and the required demand velocity. By providing a sequence of demand velocities, the servo head 30A can be made to initially accelerate from an initial track and then decelerate to any selected destination track. Such selection is provided to the microprocessor 60 from an interface circuit 74, which provides communication capabilities between the disc drive 10 and a host computer (not shown).

In order to provide a general illustration of the problems associated with acoustic noise generation during seeks, FIGS. 3a–3c have now been provided which illustrate a prior art methodology in which a velocity profile may be obtained for the disc drive 10 of FIG. 1. More particularly, FIGS. 3a–3c provide corresponding graphical representations of a current profile, a velocity profile, and resulting disc drive housing vibration, respectively for the disc drive 10 of FIGS. 1 and 2.

Generally, the development of a velocity profile such as shown in FIG. 3b begins with the selection of a current profile which describes the desired current through the actuator coil 52 as a function of time during deceleration of the servo head 30A to a destination track. Typically, such current profiles will have the form indicated at 78 in FIG. 3a. The graph of FIG. 3a includes a vertical axis indicative of coil current magnitude and a horizontal axis indicative of time, so that the current profile 78 is plotted against these axes with positive and negative values of the current profile 78 indicative of acceleration and deceleration of the head, respectively. The current profile 78 can be selected in accordance with any desired criteria, including vibration constraints of the disc drive and current-supply capabilities of the power amp 50.

Once the current profile 78 has been selected, the velocity of the head 30A as a function of time during deceleration can be determined from a selected maximum velocity (Vmax) the head 30A is to attain during a seek by integration of the current profile 78. The total time for the deceleration is selected so that, for a particular servo system, the selected current profile 78 will cause the head 30A to come to rest at the destination track at the end of the deceleration. A second integration will yield the distance that the servo head 30A will move as a function of time during deceleration, so that elimination of time between the velocity and distance expressions will yield a deceleration portion 80 of the velocity profile of FIG. 3b. As indicated in FIG. 3b the deceleration portion 80 of the velocity profile is provided in terms of the number of tracks to go, with the destination track corresponding to zero tracks to go. The deceleration portion 80 of the velocity profile will be defined only for the number of track required to bring the head 30A to rest, using the current profile 78 of FIG. 3a, from the maximum velocity during a seek as indicated at velocity Vmax in FIG. 3b. The velocity profile is then extended to any number of tracks by selecting the value Vmax for the profile velocity for longer seeks, as indicated by a portion 82 of the curve shown in FIG. 3b.

In conventional seeks, the velocity profile comprises the individual demand velocities that are to be periodically outputted to the subtractor circuit 66 of FIG. 2. The velocity profile is organized as a table of demand velocities with respect to the number of tracks to go, and this table is stored as a look-up table accessible by the microprocessor 60. Thus, during a seek, the interface circuit 74 will provide a seek command signal to the microprocessor 60 along with the destination track number. In response thereto, the microprocessor 60 will determine the number of tracks in the seek and will store this number in the counter 58. Once the counter 58 has been initialized, the profile velocity corresponding to the number of tracks the head is to be moved is outputted to the latch 62. As a result of the subsequent operation of the latch 62 and the DAC 64 in providing the profile velocity value to the subtractor circuit 66, a control signal is outputted on signal path 72 to the power amp 50, the control signal being proportional to the difference between the profile velocity and the actual velocity (nominally, the actual radial velocity of the head 30A will be zero at the beginning of a seek). For clarity of illustration, dotted lines 86 and 88 shown in each of FIGS. 3a–3c are indicative of the initial track and the destination track, respectively, for the seek operation.

Generally, at the beginning of the seek operation of the microprocessor 60 will call for the maximum velocity the head 30A is to attain during the seek. Because the initial actual velocity of the head 30A will be substantially zero, the subtractor circuit 66 will provide a large control signal to the power amp 50, resulting in a rapid initial rise in the current through the actuator coil 52 and a rapid acceleration of the head 30A toward the destination track. This initial rise in current is represented by portion 90 in FIG. 3a.

As the seek progresses, the head 30A will leave the fine control region about the initial track and will pass over a succession of intermediate tracks located between the initial and destination track. As each of these intermediate tracks are passed, the demodulator circuit 42 will provide a track crossing pulse to the counter 58, which will decrement the initially stored value accordingly, providing a continuous status of the location of the head 30A relative to the destination track during the seek. In response to the value in the counter 58, the microprocessor 60 will look up the required demand velocity from the velocity profile and output this velocity to the latch 62. However, once the seek has been initiated the actual velocity of the head 30A will no longer be equal to zero, so the current provided by the subtractor circuit 66 will decrease (as indicated by portion 92 in FIG. 3a) as the actual velocity of the head 30A approaches the maximum velocity required by the velocity profile. Generally, this drop in current will initially be very rapid and will subsequently become zero as the actual velocity of the servo head 30A approaches and then stabilizes at the maximum velocity Vmax, as shown by portions 82 and 96 in FIG. 3b.

In order to minimize the time required to complete the seek, the proportionality constants for the power amp 50 and the subtractor circuit 66 are generally made large enough so that the magnitude of the current passed through the coil between the two portions 90, 92 of FIG. 3a will be determined by the power supply voltage and the back emf induced in the actuator coil 52. Thus, the current profile will further exhibit a slowly decaying portion that has been indicated at 94.

Once the maximum velocity Vmax has been substantially achieved by the head 30A, this velocity will be maintained until the head 30A reaches the distance from the destination track required to decelerate the head 30A from the maximum velocity Vmax to rest (shown at 102 in FIGS. 3a–3c). As provided above, the deceleration of the head 30A to the destination track occurs in accordance with the deceleration current profile 78 of FIG. 3a and the deceleration portion 80 of the velocity profile of FIG. 3b.

One problem of particular interest that arises from effecting a seek in this manner is illustrated by FIG. 3c, which is a graphical representation of the top cover acceleration (vibration) of the disc drive 10 induced by the seek. As will be recognized by those skilled in the art, the sharp increase and subsequent decrease in the actuator coil current indicated at 90 and 92 in FIG. 3a correspond to a rapidly increasing force between the actuator coil 52 and the magnets of the VCM 32. The disc drive structure is thereby subjected to two successive impulses which can excite normal modes of vibration in the actuator assembly 20 and in the disc drive structure, peaks of which are shown at 98 and 100 in FIG. 3c. This vibration generates undesirable acoustic noise during relatively long seeks of the disc drive 10, as well as during repetitive seeking of the drive.

As provided hereinabove, during the design phase of a prior art disc drive, typically the effects of the top cover acceleration (as illustrated in FIG. 3c) during seeks are evaluated on prototype, operational drives. When such acceleration is deemed to be excessive and therefore undesirable, design efforts are undertaken to reduce this acceleration by, for example, modify the existing values in the velocity profile so as to reduce the excitation of the mechanical resonances in the disc drive structure. Such efforts might also be made in conjunction with attempts to add compliant materials to the disc drive structure to suppress the generation of sound pressure during the seeks or to modify the disc drive structure mechanical response, as described hereinabove. These efforts can generally be characterized as an empirical, trial and error approach as the conflicting requirements of minimizing access time, acoustic noise generation, space requirements and cost are juggled in an attempt to arrive at a generally acceptable design compromise.

The present invention, however, provides an improved, analytical method for optimizing a disc drive velocity profile, whereby the optimum demand velocities in the profile are selected using both time and vibro-acoustic constraints. This optimization of the velocity profile involves identifying the shortest possible seek length (i.e., fewest number of samples in the velocity profile) that can achieve an acoustic response that is below a desired constraint limit.

More particularly, as explained below, an accurate, high-order dynamic model of the disc drive is formulated, describing the vibro-acoustic output of the drive in response to actuator coil current input, taking into account the disc drive actuator structure and the electrical response of the servo circuit. From this dynamic model, the shortest possible seek time is determined for a selected seek length which can achieve a vibro-acoustic output below a selected, maximum limit. Once the shortest possible seek time is determined which can meet this limit, the demand velocity values in the velocity profile are selected so as to minimize the maximum position error during the head settle time. A variety of limits can be used to generate a trade-off graph which can be used by a disc drive designer to select the optimum seek time, and hence the optimum velocity profile. Once selected, the demand velocity values are subsequently provided in a look up table for use during a seek by the disc drive servo circuit.

Further, the method of the present invention treats the optimization problem as a linear program (LP), in order to solve for both minimum seek time and minimum off-track during settle, with a given vibro-acoustic constraint. The benefits of analyzing the problem as an LP include the fact that, unlike conventional techniques such as the HJB approach mentioned above, the problem size does not depend upon the order of the system. Additionally, the problem input can be obtained from measured impulse response data. Finally, data from a population of systems can be used to find a robust solution, which is an extremely important consideration in the large-scale manufacturing of disc drives.

To describe the method of the present invention, reference is now made to FIG. 4 which provides a graphical representation of an input current profile 110 and an acceleration curve 112 for a seek carried out by the disc drive 10, plotted against a common, horizontal time axis. In a similar fashion as previously shown in FIGS. 3a and 3c hereinabove, FIG. 4 illustrates an output response of the disc drive 10 in terms of top cover acceleration (curve 112) obtained from the input current profile 110 which represents the current provided to the actuator coil 52 during the seek. It will be recognized that the disc drive structure, which includes the actuator assembly 20 and the housing base 12 (as well as associated masses within the disc drive connected to these components) possesses complex mechanical resonances which can be readily excited by the rapid acceleration and deceleration of the head 30A, as shown by the acceleration curve 112.

In practicing the method of the present invention, the first step is to obtain response data such as illustrated in FIG. 4. That is, a selected disc drive or a population of nominally identical drives are subjected to a broad-spectrum input and the response to this input is then measured. The input should be "persistently exciting", that is, the input should contain sufficient frequency components to excite all modes of the disc drive (also referred to as the "plant") being tested.

The excitation of the plant may be accomplished in a variety of ways, including the use of repetitive seeks or subjecting the plant to a controlled spectrum of sinusoidal or random vibration (such as with a vibration table). However, as the present method generates a velocity profile in terms of head demand velocities, the preferred approach is to provide the necessary excitation of the disc drive structure by performing repetitive one-track seeks (that is, seeks to immediately adjacent tracks) and recording the current provided to the actuator coil 52 (such as with a digital oscilloscope) for each of these seeks.

The output response of the disc drive structure from these inputs may also be quantified in a variety of ways, including the measurement of sound-pressure (such as in an anechoic chamber) or measuring acceleration. However, as acoustic noise is generally caused by vibration of the disc drive top cover, it has been found preferable to measure top cover acceleration by way of one or more accelerometers placed on the disc drive top cover (not shown), so that, during the first step, quantified output v. input data such as represented by FIG. 4 is obtained for the disc drive 10.

Once this data is obtained, the next step is to determine a transfer function (input response) that generally describes the relationship between the output acceleration response and the input current profile 110. The plant can be described as a linear system, and so well known system identification techniques can be applied using iterative software which uses the input and output data to find coefficients of an input response matrix $H_a$ such that:

$$y = H_a u \qquad (1)$$

with y being the output and u being the input (y and u being 1×N vectors, having values for time 1 to N). More particularly, in the preferred embodiment MATLAB 4.2c software (with the System Identification toolbox) by Mathworks, Inc. is used for such system identification and FIG. 5 provides a general flow diagram of the steps performed in determining the input response $H_a$. It will be recognized that, once the coefficients of the matrix $H_a$ are known, the plant output response can be predicted based upon any given input profile.

Referring to FIG. 5, the system identification flow diagram shown therein begins with block 120, wherein the input and output plant data is entered. For reference, in the preferred embodiment this data comprises the digital o-scope data represented in FIG. 4 (output acceleration curve 112 and input current profile 110). Once this data is entered, the curves 110 and 112 are quantized into discrete sample points at block 122 using a selected sampling interval (such as, for example, every 45 microseconds). It will be recognized that the system identification flow uses an iterative approach based upon discrete representations of the input data to solve for the coefficients of the transfer function, and so the selection of an appropriate sampling interval will depend upon the time-scale of the data as well as the desired resolution.

Continuing with the flow of FIG. 5, the next step is to select the order of the plant response, as indicated at block 124. As provided hereinabove, the transfer function describing the output response of the plant with respect to the input stimulus can be generally described as a quotient comprising a numerator polynomial over a denominator polynomial, with the order thereof corresponding to the order of the system. It is thus necessary to select the order so that the flow can iterate to estimates of the coefficients of these polynomials. It will be recognized that the order of the acceleration response of a disc drive top cover during a seek will generally be unknown and will further depend upon several factors, including the mechanical structure of the drive; however, trial and error with particular disc drives has found this response to be around 12th order. Thus, the order of the system is estimated and entered at block 124. Of course, when the estimate is substantially incorrect, the resulting predictive model will not satisfactorily describe the response of the system, but new estimates may be subsequently provided as required to improve the results obtained from the predictive model.

The flow of FIG. 5 continues at block 126 wherein, in response to the input data from block 120 and the estimated order of the plant response entered at block 124, the system identification iteratively solves for estimates of the coefficients in the transfer function using well known numerical techniques. Once estimates of the coefficients are determined, the flow continues at block 128 wherein the response of the plant is predicted based upon the coefficients calculated in block 126. That is, the estimated coefficients of the transfer function are used with the quantized input stimulus data to provide an estimate of the response of the plant, and this predicted response is compared to the actual response of the plant. The comparison may be performed graphically as well as statistically.

Once the comparison of block 130 is performed, a decision is made whether the results are acceptable, as generally indicated by decision-block 132. If the results fall out of either quantifiable or qualifiable decision criteria, then the flow of FIG. 5 returns to block 124 wherein improved estimates of the order of the plant response are provided and steps 126–132 are performed again. Once an acceptable response prediction has been obtained, the flow continues to block 134, wherein the Toeplitz matrix for the transfer function H is calculated.

Thus, the response y of the plant from rest as a result of an input u can be described as:

$$y(k) = \Sigma_{j=1 \; to \; N} h(k-j) u(k) \quad (2)$$

where y(k) is the response (in terms of samples k), u(k) is the input signal, and h(k−j) is the transfer function (impulse response) determined by the flow of FIG. 5. Equation (2) can also be represented in matrix form as:

$$y(N) = \begin{vmatrix} h(0) & 0 & 0 & \ldots & 0 \\ h(1) & h(0) & 0 & \ldots & 0 \\ h(2) & h(1) & h(0) & \ldots & 0 \\ \cdot & \cdot & \cdot & & \cdot \\ \cdot & \cdot & \cdot & & \cdot \\ \cdot & \cdot & \cdot & & \cdot \\ h(N) & h(N-1) & h(N-2) & \ldots & h(0) \end{vmatrix} \begin{vmatrix} u(0) \\ u(1) \\ u(2) \\ \cdot \\ \cdot \\ \cdot \\ u(n) \end{vmatrix} \quad (3)$$

which corresponds to the matrix notation for this same equation given in (1) above. That is, y and u are vectors and $H_a$ is the Toeplitz matrix for the acceleration response; moreover, y is linear with respect to u.

Once the acceleration response of the plant has been identified, the next step in the method of the present invention is to generate a dynamic model of the disc drive, beginning with the actuator. Referring first to FIG. 6, shown therein is a simplified rigid body diagram of the actuator assembly 20 of FIGS. 1 and 2. More particularly, FIG. 6 shows the head 30A, the flexure 26, the head arm 28, the pivot shaft 24, the actuator coil 52 and the flex circuit 36 of the actuator assembly 20. As will be recognized, the flex circuit 36 provides spring forces upon the actuator assembly 20 as the angular position of the head 30A changes with respect to the pivot shaft 24. More particularly, the flex circuit 36 can be dynamically modeled as a light mass 140 in series with a pair of springs 142, 144, each having a spring constant k/2. The actuator assembly 20 rotates about the pivot shaft 24 in response to current passed through the actuator coil 52, as the resulting coil magnetic field interacts with the field of the permanent magnets (not shown) of the VCM 32. Thus, it will be recognized that the actuator assembly 20 can be represented in state space notation as a continuous time system such that:

$$dx(t)/dt = Ax(t) + Bu(t) + B_\omega \omega(t) \quad (4)$$

$$y(t) = Cx(t) + K_p v(t) \quad (5)$$

where x(t) represents position of the head (with respect to time t), u(t) is applied coil voltage, y(t) is the head position, ω(t) is the exogenous plant disturbance and v(t) is sensor error (measurement error).

Additionally, it will be recognized that the forces acting upon the actuator coil 52 as it moves with respect to the permanent magnets (not shown) of the VCM 32 can be described by the well-known Lorentz equation. Thus, a 3rd order electrical model of the actuator assembly 20 can be written as:

$$\dot{I}(t) = -I(t)(R_m/L_m) - \omega(t)(C/L_m) + u(t)/L_m \quad (6)$$

$$\dot{\theta} = \omega(t) \quad (7)$$

$$\dot{\omega} = I(t)(K_t/J_m) - \omega(t)(K_v/J_m) - \theta(t)(K_s/J_m) \quad (8)$$

where I(t), θ(t) and ω(t) represent current, angular position and angular velocity of the head with respect to time, respectively. Additionally, $R_m$ and $L_m$ are the resistance and inductance, respectively, of the actuator coil 52 and $J_m$ represents the total mass of the actuator assembly 20 (as a lumped mass, neglecting the effects of the flex circuit 36).

The electrical model of equation (5) can be discretized assuming a zero-order-hold with sample time T, resulting with a system having states $x = [I \; \theta \; \omega]^T$ and state equations:

$$x(k+1) = Ax(k) + bu(k), \; x(0) = 0 \quad (9)$$

$$y(k)=Cx(k) \tag{10}$$

with the output vector y(k) having two elements, ω and I. Such characterization of a disc drive actuator is well known by those skilled in the art and has in the past been used as a model to provide optimal control of the actuator (see, for example, the previously discussed Bryson et al. reference).

With this background, reference is now made to FIG. 7, which shows a block diagram 152 for the disc drive 10. More particularly, FIG. 7 shows a VCM/actuator block 154 having an operation that is generally described by the foregoing 3rd order electrical model for the actuator assembly 20. The output from the block 154 is denoted as y(t), which can be either velocity (in seek mode) or position (in track following mode). Additionally, the block diagram 152 shows an h-bridge driver block 156, which provides the current signals to the VCM/actuator block 154 as shown. A sense resistor block 158 allows for closed-loop feedback by a transconductance block 160. Finally, the h-bridge driver block 156 has a conventional compensation lead/lag filter at block 162, having an input response as shown.

In this manner, the block diagram 152 of FIG. 7 generally illustrates the operation of the power amp 50 in conjunction with the actuator assembly 20 in providing an output y(t) in response to an input (current) signal u(t). Once this dynamic model of the actuator assembly 20 and power amp 50 is obtained, the next step is to add the controller circuitry to this model and FIG. 8 has been shown for this purpose.

Referring now to FIG. 8, shown therein is a state diagram 164 of the entire servo control circuit 40, the actuator assembly 20 and the power amp 50, with the blocks A, B, and C corresponding to the block diagram of FIG. 7. More particularly, A represents a matrix describing the dynamics of the block diagram of FIG. 7 and B and C represent input and output vectors, respectively. It will be recognized by those skilled in the art that the remaining blocks in FIG. 8 correspond to the operation of the servo control circuit; see for example, Franklin et al. "Digital Control of Dynamic Systems", Addison Wesley, 2nd Edition, 1990, pp. 250–280.

The state diagram 164 of FIG. 8 describes the closed loop operation of the disc drive 10 for both seek and track following modes. In each of these modes, estimated state feedback is used with a reference input, $R_{ref}$, which will be explained in more detail hereinbelow. Further, the estimator portion of the state diagram (comprising blocks $\bar{A}$, $\bar{B}$ and $\bar{C}$) has a gain vector L and states $\bar{x}$. The plant portion of the state diagram 164 (comprising blocks A, B and C) has states x with feedback gain K. Thus, the state equations for the state diagram 164 are $$x_{sys}(k+1) = \begin{vmatrix} A - BKLC & -BK(I-L\bar{C}) \\ (\bar{A}-\bar{B}K)LC & (\bar{A}-\bar{B}K)(I-L\bar{C}) \end{vmatrix} x_{sys}(k) + \begin{vmatrix} BKN_r \\ \bar{B}KN_r \end{vmatrix} R_{ref} \tag{11}$$

$$\equiv A_{sys}x_{sys}(k) + B_{sys}R_{ref}(k)$$

with the state given by $x^T_{sys}=[x^T \bar{x}^T]$. The system output is $$y_{sys}(k)=[C\bar{0}]x_{sys}(k)=C_{sys}x_{sys}(k) \tag{12}$$

and the control effort for the closed loop system is $$u(k)=[-KLC\ K(I-L\bar{C})]x_{sys}(k)+KN_rR_{ref}(k)$$

$$\equiv C_ux_{sys}(k)+KN_rR_{ref}(k) \tag{13}$$

Next, use $h_{sys}(k)$ to represent the impulse response from $R_{ref}$ to $y_{sys}$ and use $h_u(k)$ to represent the impulse response from $R_{ref}$ to u, so that the operation of the state diagram 164 in FIG. 8 is described by the following state space representations $$y_{sys}=H_{sys}R_{ref} \tag{14}$$

$$u=H_uR_{ref} \tag{15}$$

In seek mode, equations (14) and (15) describe the closed loop velocity control of the state diagram 164 of FIG. 8, where $R_{ref}$ represents the demand velocity, $y_{sys}$ is the output head position and u is the input current.

Once state space representations have been identified describing the disc drive 10, the next step is to identify the impulse response $h_i(k)$ from the input reference command $R_{ref}$ to each plant state and estimator state. The following Toeplitz matrices are formed from the resulting impulse responses $h_i(k)$.

TABLE I

| Matrix | Description | Size | Command Reference ($R_{ref}$ to) |
|---|---|---|---|
| $H_{vel\_x}$ | command to $y_p$ | (NxN) | plant position |
| $H_{vel\_v}$ | command to velocity | (NxN) | plant velocity |
| $H_{vel\_il}$ | command to current | (NxN) | actuator current |
| $H_{vel\_u}$ | command for control effort | (NxN) | actuator voltage |
| $H_{vel\_ex}$ | command to est. $y_p$ | (NxN) | estimated position |
| $H_{vel\_ev}$ | command to est. velocity | (NxN) | estimated velocity |
| $H_{vel\_eil}$ | command to est. current | (NxN) | estimated bias current |

It will be recalled that the Toeplitz matrix $H_a$ describing the acceleration response of the disc drive 10 was previously determined with respect to FIG. 5. Thus, the matrices listed in Table I and the matrices $H_a$, $H_{sys}$ and $H_u$ are used to model the overall response.

Once these matrices are identified, the next step is to specify a constraint on the top cover acceleration, $\gamma_a$, describing the maximum acceptable amount of top cover acceleration (for example, a typical value for $\gamma_a$ might be 0.5 meter/sec$^2$). Once the acceleration constraint $\gamma_a$ has been so identified, then the optimization problem can be stated in the generalized LP form:

minimize $c^Tu$ subject to $Au \geq =b$ (16)

wherein A is a matrix comprising the Toeplitz matrices of Table I, $H_a$, $H_u$, $H_{sys}$ and $\gamma_a$; c and b are vectors; and u is the velocity command trajectory, for which the optimization problem solves (and corresponds to the values in the velocity profile).

Solving LP optimization problems is well known in the art and the solution of equation (16) is preferably obtained using the "constraint.m" solution engine in the Matlab Optimization toolbox (MATLAB 4.2c software). Generally, however, the solution routine first determines the minimum number of samples that are required for a velocity demand profile in order to meet the acceleration constraint $\gamma_a$. That is, after the maximum acceptable level of acoustic noise is identified, the routine uses a bisection iterative approach to identify a solution having a number of samples, n (i.e., the minimum seek length) such that Au+b≥0.

By way of example, for a given seek length, a sample constraint of 60 might first be tried and, if an acceptable solution is found using 60 samples, a second sample constraint of 30 is used. If 30 samples is too few to achieve the acceleration constraint during the seek, 45 will then be tried. At some point, the minimum number of samples will be determined; for example, 45 samples result in a viable solution but 44 do not. In such a case 45 would be identified as the minimum number of samples, n, required to meet the acceleration constraint.

Once the minimum number of samples is fixed, the optimum values of the velocity command trajectory are found that meet the objective $c^T u$ (this objective can be defined as the maximum overshoot at arrival to the destination track). The solution of the LP minimization problem of equation (16) can then be repeated for various values of $\gamma_a$ and the results evaluated in graphical form, such as in a pareto chart. Once the optimal profile is determined, the values of the vector u (representing the values of the velocity profile) are stored in a look up table on a guardband of the discs and loaded into RAM for use by the microprocessor 60 during subsequent one track seeks.

Because the optimization problem of equation (16) is global, there will be no better solution u which meets the acceleration constraint $\gamma_a$ and improves upon the objective $c^T u$. This is true even if a computer were to search exhaustively over all values and lengths of u, or a skilled engineer were to empirically adjust u by hand.

To illustrate the foregoing method by way of example, the steps used to identify the optimum values in a velocity profile for a one track seek of the disc drive 10 will now be discussed. A one track seek is typically performed with the drive remaining in a track following mode, but the target position is the center of the adjacent (destination) track so that the actuator is moved using a feedforward command that is summed with u(k) for the first n−1 samples. At this point, the drive should reach the target position $y_d$ with a tolerance $\gamma_p$.

Initially, the output acceleration and input current curves of FIG. 4 are obtained and used to generate the $H_a$ matrix in accordance with FIG. 5. It will be recalled that the input current profile has a sufficiently broad spectrum so as to excite all resonances of interest in the plant; thus, the same input and output data can be used in the generation of the velocity profile for all seek lengths. The dynamic model of the disc drive 10 is further determined in accordance with FIGS. 6–8. Next, the optimization problem in accordance with equation (16) is then formulated and solved, using a sample constraint of n=10 and, in turn, acceleration constraints $\gamma_v$=1.0, 0.7, 0.5, 0.4, 0.3, 0.2 and 0.1 m/sec². FIG. 9 provides a table showing the resulting solution of the optimization problem for these various constraints.

As shown in FIG. 9, the one track seek can be accomplished in three samples and still result in top cover acceleration of less than 1.0 m/s², using the values of the velocity profile shown in the table (336 in step 1, −167 in step 2 and 4 in step 3). Likewise, top cover acceleration of less than 0.1 m/s² can be achieved using six samples having the values shown. Thus, doubling the seek length (from 3 to 6 samples) results in an order of magnitude reduction in acceleration (from 1.0 m/s² and 0.1 m/s².

FIG. 10 shows a pareto curve 172 plotted using the data from the table of FIG. 9, with the horizontal axis representing the number of samples and the vertical axis representing the top cover acceleration. Points located on and to the right of the pareto curve 172 represent feasible solutions for a one track seek. The desired solution can be determined from the tradeoffs in acceleration and seek time illustrated therein and then loaded into a look up table for use during subsequent one track seeks. Referring now to FIG. 11, shown therein is a similarly determined pareto curve 182 for a short seek of 40 tracks for the disc drive 10. Point 184 on the curve 182 is the minimum seek length (22 samples) with no constraints on vibration (and results in top cover acceleration of 12 m/s²). The addition of one more sample to the seek length, however (23 samples, instead of 22 samples) results in a top cover acceleration of 4 m/s², and a seek length of 26 samples (shown at point 188) achieves a top cover acceleration of 1 m/s². Thus, increasing the seek length by four samples (from 22 to 26) reduces the acceleration twelve-fold.

It will clear that the present invention is well adapted to carry out the objects and attain the ends and advantages mentioned as well as those inherent therein. While a presently preferred embodiment has been described for purposes of this disclosure, numerous changes may be made which will readily suggest themselves to those skilled in the art and which are encompassed in the spirit of the invention disclosed and as defined in the appended claims.

What is claimed is:

1. In a disc drive of the type having a disc and an actuator adjacent the disc, the disc including a plurality of concentric tracks for the storage and retrieval of data by a head mounted to the actuator, the disc drive including a voice coil motor and servo positioning circuitry to position the head relative to the disc and to perform a seek wherein the head is moved from a position adjacent an initial track to a position adjacent a destination track through the controlled application of current to the voice coil motor, the servo positioning circuitry including the use of a velocity profile, the velocity profile characterized as a plurality of samples, each sample corresponding to a discrete radial velocity of the head, and wherein during a seek the servo positioning circuitry controls the velocity of the head in accordance with the velocity profile, an improved method for generating the velocity profile for the disc drive, comprising the steps of:

obtaining an input response of the disc drive, the input response characterized as the relationship of output mechanical acceleration to input current to the voice coil motor;

formulating a dynamic model of the disc drive, the dynamic model describing the electrical and mechanical characteristics of the disc drive;

providing an acceleration constraint, the acceleration constraint characterized as the maximum acceptable level of mechanical acceleration during a seek;

selecting a seek length comprising a selected number of tracks;

using the input response and the dynamic model to determine a minimum number of samples that achieves a level of mechanical acceleration equal to or less than the acceleration for the selected seek length;

optimizing the velocity profile values corresponding to the minimum number of samples to minimize the level of mechanical acceleration generated by a seek of the selected length;

storing the velocity profile values in the disc drive; and thereafter, using the velocity profile values to perform a seek of the disc drive.

2. The improved method of claim 1, wherein the step of obtaining an input response of the disc drive comprises the steps of controllably exciting the disc drive with a broad spectrum input and measuring the resulting mechanical acceleration of a selected portion of the disc drive.

3. The improved method of claim 2, wherein a plurality of nominally identical disc drives are used to obtain the input response of the disc drive.

4. The improved method of claim 1, wherein velocity profile values are optimized for a plurality of acceleration constraint values.

5. A method for optimizing a velocity demand profile in a disc drive having a disc and an actuator adjacent the disc, the disc having a plurality of concentric tracks, the disc drive further having a servo controller for positioning the actuator relative to the disc and further for performing seeks from an initial track to a destination track in accordance with the velocity demand profile, the velocity demand profile described as a plurality of samples, each sample having a discrete current level, the optimized velocity demand profile providing optimum seek time and acoustic noise levels for the actuator, the method comprising the steps of:

characterizing an acoustic output of the disc drive in response to a current input by exciting the disc drive with mechanical energy while measuring mechanical acceleration of the disc drive;

obtaining a transfer function describing the acoustic response of the disc drive as a linear relationship between the disc drive current input and the acoustic output, the transfer function providing an acoustic model of the disc drive;

providing a rigid body dynamics model of the actuator, the rigid body dynamics model describing the actuator as a single mass system;

combining the acoustic model and the rigid body dynamics model to provide an actuator dynamic model for the disc drive, the actuator dynamic model capable of predicting actuator position and acoustic noise level outputs based on current level inputs to the actuator;

providing a servo controller dynamic model of the servo controller;

combining the actuator dynamic model with the servo controller dynamic model to provide a total system dynamic model of the disc drive, the total system dynamic model capable of predicting actuator position and acoustic noise level outputs based on a velocity demand profile;

providing a maximum limit for acoustic noise, the maximum limit providing a constraint on the noise generated by the actuator during a seek;

using the total system dynamic model to determine a minimum number of samples for a velocity demand profile that will provide an acoustic noise level that is less than the maximum limit for acoustic noise;

optimizing the current level values for the minimum number of samples to provide an optimized velocity demand profile, the optimized velocity demand profile having the lowest achievable acoustic noise level for the number of samples, the optimized velocity demand profile expressed as a table listing the current level values for each sample in the profile;

installing the table in disc drive memory; and thereafter, using the table to perform seeks in the disc drive.

6. The improved method of claim 5, wherein the step of characterizing an acoustic output of the disc drive in response to a current input comprises the steps of controllably exciting the disc drive with a broad spectrum input and measuring the resulting mechanical acceleration of a selected portion of the disc drive.

7. The improved method of claim 5, wherein a plurality of nominally identical drives are used to obtain the transfer function describing the acoustic response of the disc drive.

8. The improved method of claim 5, wherein the current level values are optimized for a plurality of acceleration constraint values.

* * * * *

UNITED STATES PATENT AND TRADEMARK OFFICE
CERTIFICATE OF CORRECTION

PATENT NO. : 5,668,680
DATED : September 16, 1997
INVENTOR(S) : Brian P. Tremaine It is certified that error appears in the above-indentified patent and that said Letters Patent is hereby corrected as shown below:

Column 13, line 50, insert --)-- after "(I-L$\overline{C}$".

Column 15, line 53, insert --)-- after "and 0.1 m/s$^2$".

Signed and Sealed this

Third Day of November, 1998

Attest:

BRUCE LEHMAN

*Attesting Officer*          *Commissioner of Patents and Trademarks*